F. U. FARRAND.
HAY GATHERER.
APPLICATION FILED JULY 16, 1917.

1,289,423.

Patented Dec. 31, 1918.
7 SHEETS—SHEET 1.

WITNESSES:
B Hall.

INVENTOR:
FRED U. FARRAND
BY
ATTORNEYS.

F. U. FARRAND.
HAY GATHERER.
APPLICATION FILED JULY 16, 1917.

1,289,423.

Patented Dec. 31, 1918.
7 SHEETS—SHEET 2.

WITNESSES:
B. Hall,
G. E. Sorensen

INVENTOR:
FRED U. FARRAND
BY
Paul & Paul
ATTORNEYS.

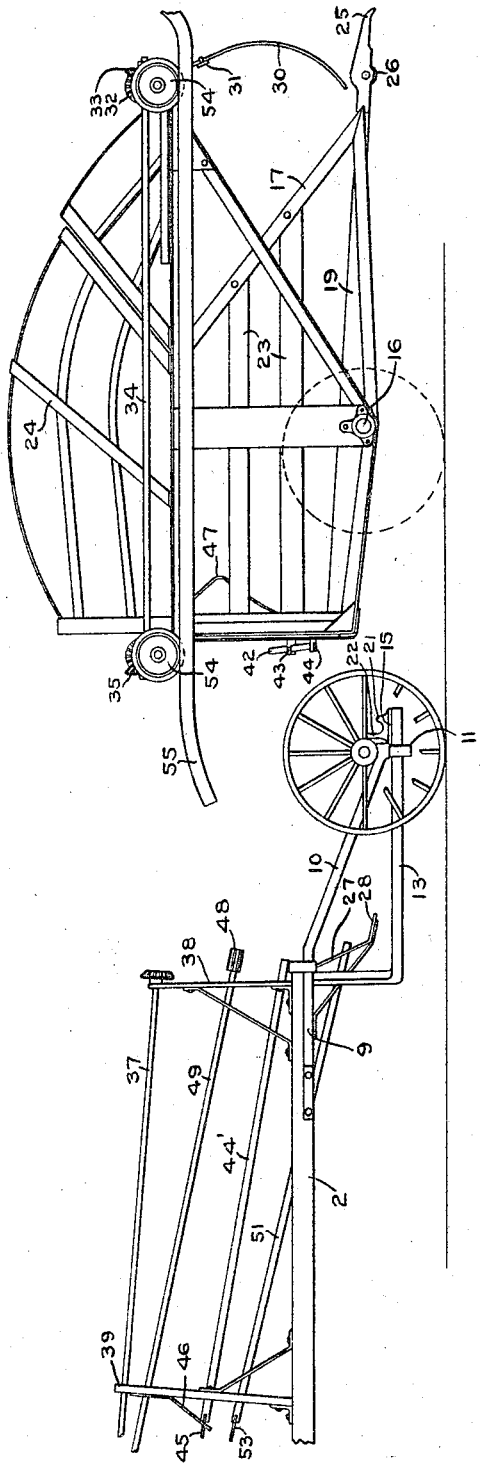

F. U. FARRAND.
HAY GATHERER.
APPLICATION FILED JULY 16, 1917.
1,289,423.
Patented Dec. 31, 1918.
7 SHEETS—SHEET 4.
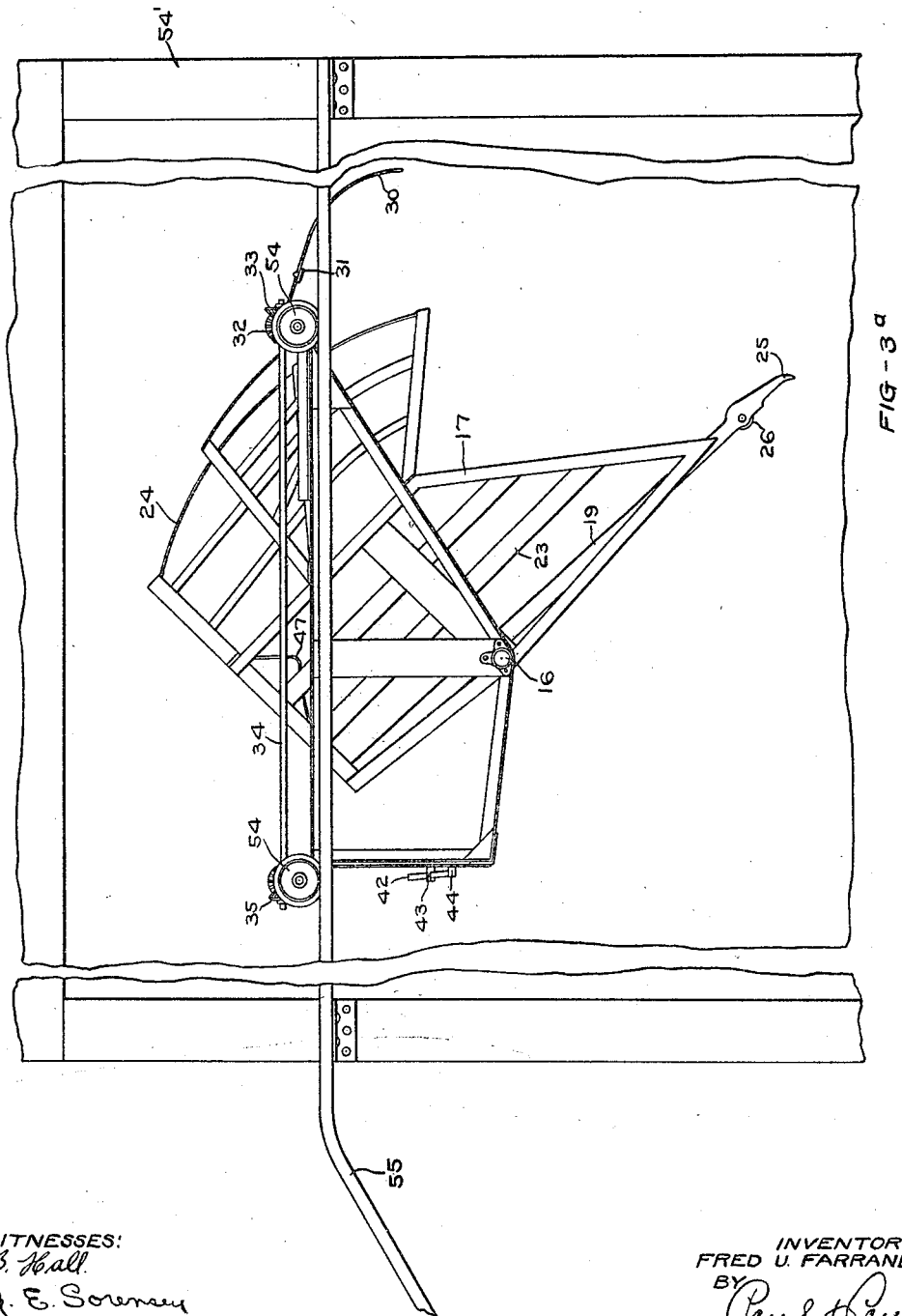
WITNESSES:
B. Hall
G. E. Sorensen
INVENTOR:
FRED U. FARRAND.
BY
Paul & Paul
ATTORNEYS.

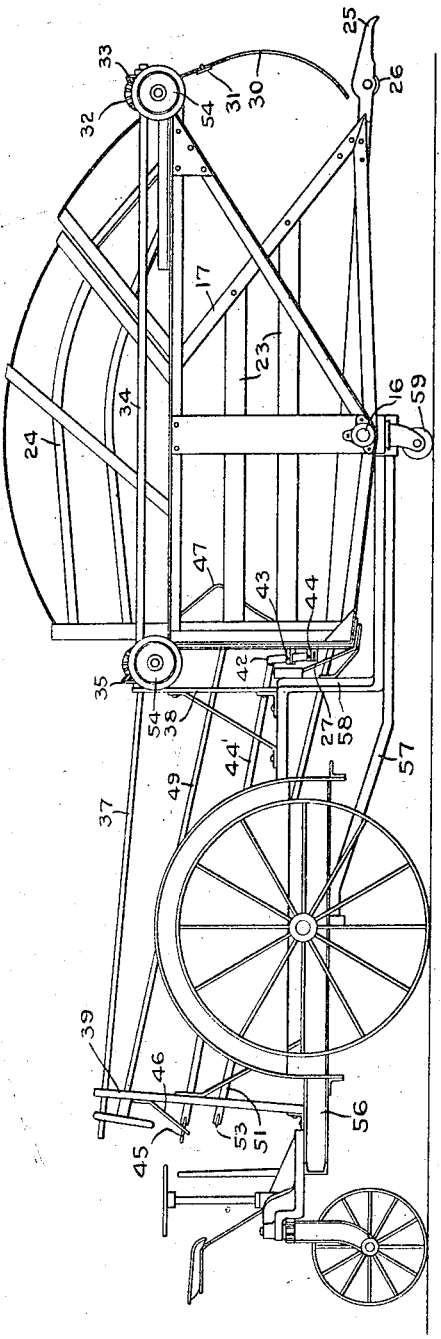

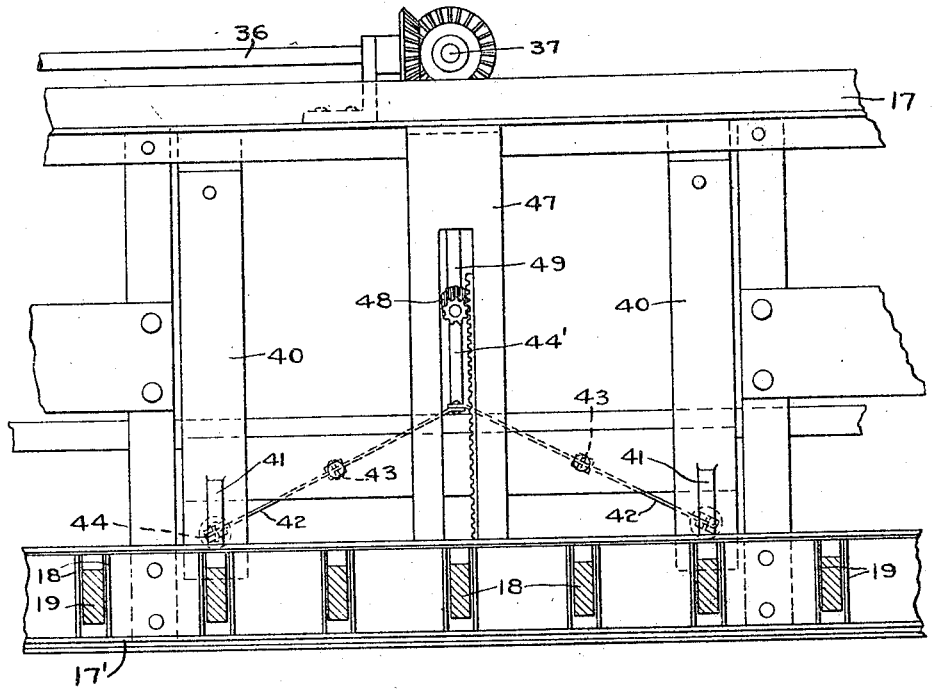
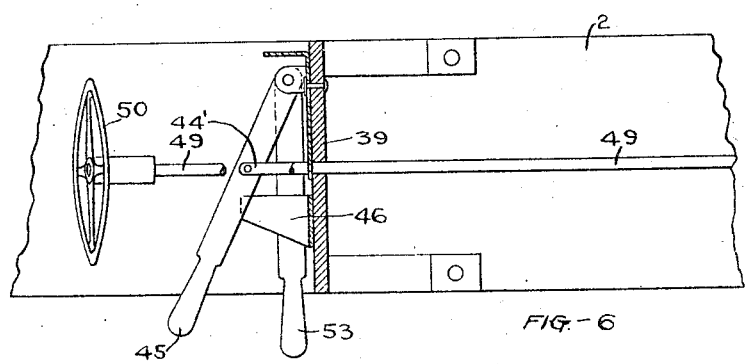
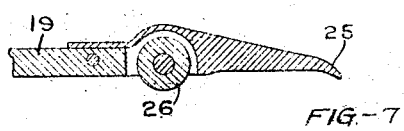

F. U. FARRAND.
HAY GATHERER.
APPLICATION FILED JULY 16, 1917.
1,289,423.
Patented Dec. 31, 1918.
7 SHEETS—SHEET 7.
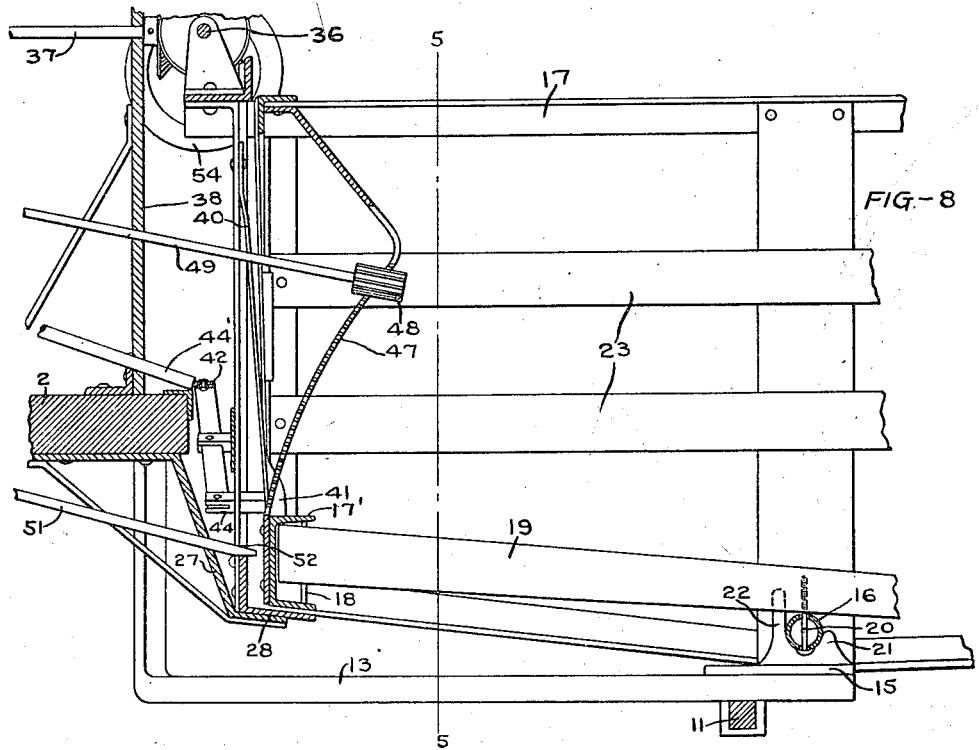
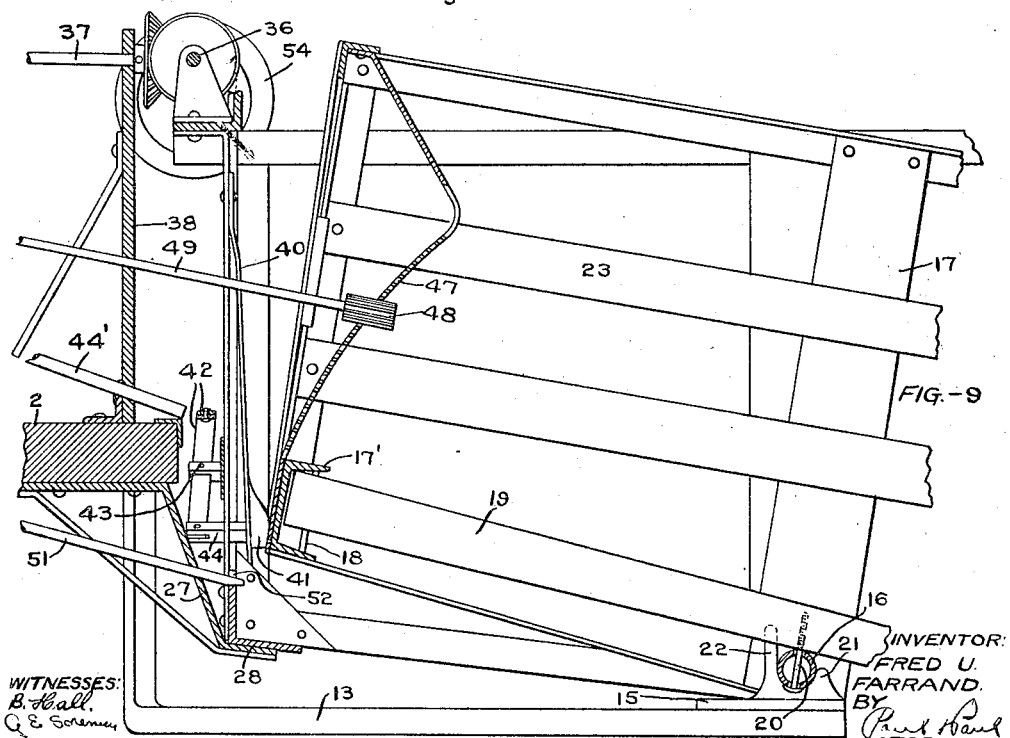
INVENTOR:
FRED U. FARRAND.
BY
ATTORNEYS.
WITNESSES:

UNITED STATES PATENT OFFICE.

FRED U. FARRAND, OF WAYZATA, MINNESOTA.

HAY-GATHERER.

1,289,423.

Specification of Letters Patent.

Patented Dec. 31, 1918.

Application filed July 16, 1917. Serial No. 180,832.

*To all whom it may concern:*

Be it known that I, FRED U. FARRAND, a citizen of the United States, resident of Wayzata, county of Hennepin, State of Minnesota, have invented certain new and useful Improvements in Hay-Gatherers, of which the following is a specification.

The object of my invention is to provide a machine by means of which hay in windrows or otherwise placed in the field can be easily and quickly gathered up and conveyed to a barn or stack.

A further object is to provide a hay gatherer having improved means for mounting the rack and dismounting it when the load is to be discharged.

A further object is to provide a hay gatherer which may be operated by animal or tractor power, as desired.

The invention consists generally in various constructions and combinations, all as hereinafter described and particularly pointed out in the claims.

Figure 1:
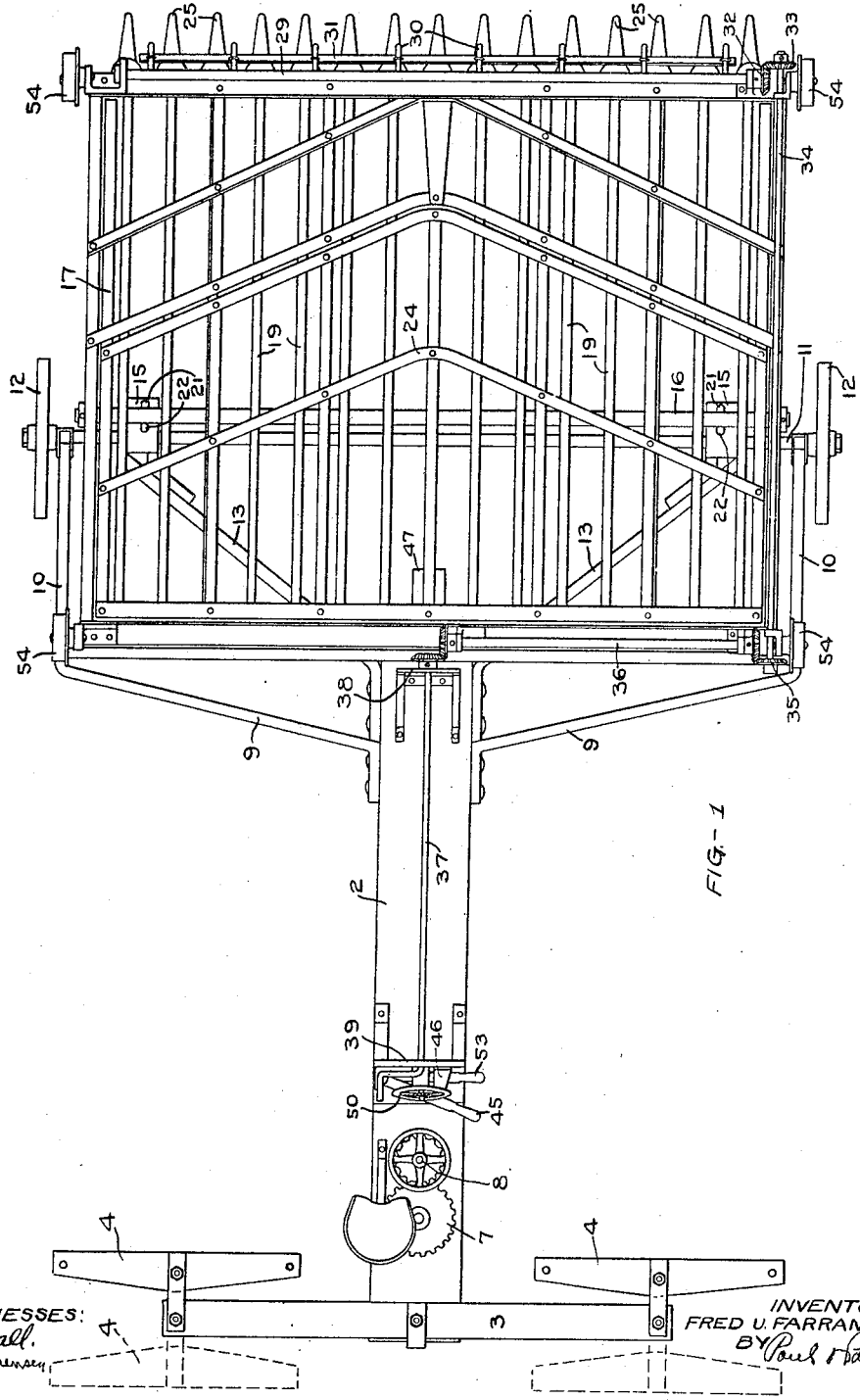
Figure 2:
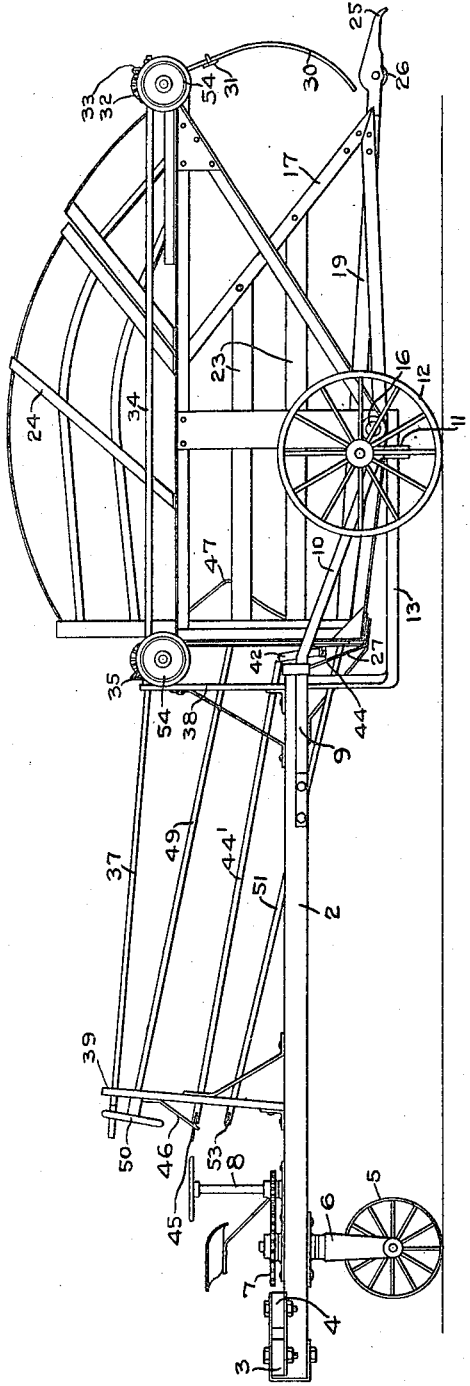

In the accompanying drawings forming part of this specification,

Figure 1 is a plan view of a hay gatherer embodying my invention,

Fig. 2 is a side elevation of the same, showing the rack in its gathering position, Fig. 3 is a similar view, showing the rack dismounted from its supporting wheels, Fig. 3ª is a view showing the hay rack in its discharging position within the barn, Fig. 4 illustrates the preferred manner of mounting the device on a tractor, Fig. 5 is a sectional view on the line 5—5 of Fig. 8, Fig. 6 is a detail sectional view, showing the means for locking the rack in its loading position, Fig. 7 is a detail sectional view, showing the construction of the forward end of one of the rack teeth, Fig. 8 is a vertical sectional view, showing the rack in its normal locked position, Fig. 9 is a similar view, showing the rack tilted to its loading position.

In the drawing, 2 represents a beam having an evener 3 at its rear end provided with swingletrees 4. This beam is supported by a caster wheel 5 having a fork 6 which is journaled in the beam and geared at 7 to a steering post 8. By turning this post the wheel 5 may be oscillated to steer the machine.

At the forward end of the beam 2, on each side thereof, are bars 9 which extend from said beam laterally and forwardly and have end portions 10 in which an axle 11 having carrying wheels 12 is mounted. These wheels form the support for the forward portion of the machine. Bars 13 are secured to the beam 2 and project forwardly and outwardly therefrom and have seats 15 at their forward ends for a shaft 16 which is mounted in a rack frame 17. The rear portion of the rack frame is provided with a channel bar 17′ having pins 18 mounted therein. Teeth 19 forming the bottom of the rack are mounted between these pins and held thereby in parallel relation and are connected with the shaft 16, which is preferably tubular in form, by means of bolts 20. The bearing of said shaft is preferably provided with lugs 21 and 22 forming guides for the shaft, the lugs 22 being higher preferably than the others and serving to guide the shaft to its seat when the gatherer is being reassembled after the rack has been dismounted.

The rack also has side rails 23 and an arched top or grating 24, which has the function of holding the hay in place in the rack when it is being moved to its discharging position.

The forward ends of the teeth 18 have downwardly turned points 25 for entering the hay and directing it backwardly into the rack and anti-friction rollers 26 are preferably mounted in these teeth to travel on the ground when the apparatus is in its gathering position. A brace 27 is mounted on the forward end of the beam 2 and has a seat 28 for the rack frame when in its loading position.

At the forward end of the rack frame is a shaft 29 having a series of forwardly and downwardly projecting teeth 30 mounted therein which extend to a point near the points of the teeth 19 and above the same and have the function of preventing the hay from working out the front end of the gatherer until the unloading point is reached. A bar 31 preferably extends transversely of these teeth and is attached thereto. The shaft 29 is provided with a gear 32 at one end meshing with a similar gear 33 on a shaft 34 which is geared at 35 to a shaft 36 which in turn is operated by a crank 37 mounted in bearings 38 and 39 on the beam 2. When this crank is rocked, its movement will be transmitted through the shafts described to the shaft 29 to raise the teeth 30 and open the entrance to the rack or lower said teeth to close said entrance.

For holding the rack against premature tilting I provide springs 40 mounted on the frame of the rack and provided with lugs 41 which engage the channel bar 17', thereby locking the rack in its horizontal position. Levers 42 are pivoted at 43 on the frame and carry pins 44 which are connected with the springs 40 and are normally in the path of the rack, as shown in Fig. 8. These levers 42 are pivotally connected with each other for simultaneous movement and a rod 44' is mounted on said beam in the guides 38 and 39 and pivotally connected with a lever 45 by means of which the said rod may be pushed inwardly to operate the levers 42 and withdraw the lugs 41 from engagement with the rack. Normally the rod 44' is held in its retracted position by a spring 46. A rack bar 47 is mounted in the gathering rack and meshes with a pinion 48 on a rod 49 which has bearings in the guides 38 and 39 and is provided with an operating wheel 50 by means of which, when the gathering rack is released, it may be tilted on its bearings to lower the point of the teeth to the ground and gather up the hay.

I also provide means for locking the frame of the rack in place, which consists of a rod 51 fitting within a socket 52 in the head of the frame and connected with a lever 53 in the guide 39. Movement of the lever will project or withdraw the rod 51 to lock or release the rack. The rack frame is provided at each corner with flanged wheels 54. These wheels have no function during the gathering operation, but as shown in Fig. 3, I provide a track 55 at the point where the load is to be discharged, said track having downwardly turned receiving ends which engage the wheels 54 and lift the rack frame and rack bodily from the carrying frame and wheels, thereby completely dismounting the gathering apparatus from its supporting wheels. At this point the attachment is made to the rack for pulling it into the barn and discharging the load. This, however, forms no part of the subject matter of this invention and is omitted from the description and illustration.

In Fig. 3ᵃ I have illustrated a continuation of the track shown in Fig. 3 and extending into the barn 54', the track being shown as mounted in the upper part of the structure and supporting the rack above the mow, so that when the locking device is tripped the rack may tilt to discharge its contents into the space provided for the hay beneath.

In Fig. 4 I have shown a slightly modified construction which consists in adapting the device for a tractor, 56 representing the frame thereof, 57 and 58 bars extending forwardly from the tractor and having supporting caster wheels 59 whereon the gathering rack and frame are mounted. In other respects the construction and operation is substantially the same as heretofore described.

In the operation of the machine, the gathering rack is tilted downwardly when the point is reached where the hay is to be gathered, the teeth 30 having been previously swung to their raised position. The rack may be filled with hay until the desired load has been obtained. The rack may then be tilted to lift the gathering teeth off the ground and the apparatus moved to a point where the flanged wheels may run upon the track and the frame and rack lifted bodily off the supporting wheels. When the load has been discharged, the rack may again be mounted on the frame and the operation described repeated.

The apparatus may be used for gathering grain as well as hay, and in various ways the details of construction herein shown and described may be modified and still be within the scope of my invention.

I claim as my invention:

1. The combination, with a wheeled frame, of a demountable rack frame carried thereby, a tilting rack mounted in said rack frame and removable with the rack frame from the wheeled frame and means for locking said demountable frame and said rack.

2. The combination with a wheeled carrying frame having bearings thereon, of a demountable rack frame having a shaft for said bearings, a tilting rack mounted in said rack frame and removable with the rack frame from the wheeled carrying frame, means for tilting said rack, and means for normally locking said rack frame and said rack.

3. The combination with a wheeled carrying frame, of a rack frame demountably carried thereby, and a tilting rack mounted in said frame and removable with the rack frame from the wheeled carrying frame.

4. The combination, with a wheeled frame, of a rack frame mounted thereon, a tilting rack mounted in said rack frame, and means for closing the top and open end of said tilting rack.

5. The combination with a wheeled frame, of a rack frame mounted therein, and a tilting rack carried by said rack frame and an arched top for said rack.

6. A hay gatherer comprising a wheeled frame, a rack frame mounted thereon, a tilting rack mounted in said rack frame, and oscillating teeth for closing the open end of said rack.

7. A hay gatherer comprising a wheeled frame, a rack frame demountably carried thereby, a tilting rack mounted in said rack frame, teeth for closing the open end of said rack, and mechanism within control of the driver of said wheeled frame for operating said teeth to open or close said rack.

8. A hay gatherer comprising a wheeled frame, bearings provided on said frame adjacent the forward end thereof, a rack frame and shaft therefor normally seated on said bearings and demountably supported thereby, and a tilting rack mounted in said rack frame and removable with the rack frame from the wheeled frame.

9. The combination, with a main frame having forward carrying wheels and a rear caster wheel, of a rack frame supported in said main frame and means for temporarily locking it therein, a rack pivoted in said rack frame and means for tilting said rack independently of said rack frame.

10. A machine of the class described comprising a beam having a caster wheel at its rear end and a frame and carrying wheels at its forward end, of a rack frame having bearings on said first named frame between and adjacent to said wheels and mounted for separation from said bearings, and a rack pivotally mounted on the rack frame and removable with the frame from the wheeled frame.

11. A hay gatherer comprising a wheeled frame, a rack frame demountably supported therein, a rack journaled on said wheeled frame and engaging said rack frame for holding it in place, means for normally locking said rack, means for tilting it on its bearings in said wheeled frame, and means carried by said rack frame for closing the forward end of said rack.

12. The combination, with a wheeled frame, of a rack frame demountably supported therein, a rack having bearings on said wheeled frame for tilting thereon, said rack fitting within said rack frame and normally holding it in place, teeth carried by said rack frame for closing the open forward end of said rack, and an operating device mounted on said wheeled frame and geared to said teeth.

13. The combination, with a wheeled carrying frame, of a rack frame demountably supported therein, a tilting rack supported by the rack frame, means for tilting said rack, and means for closing the top and open forward end of said rack.

14. The combination, with a frame having forward and rear carrying wheels and bearings adjacent said forward wheels, of a rack frame demountably journaled in said bearings, a tilting rack supported by the rack frame, and means mounted on said wheeled frame for tilting said rack.

15. The combination, with a frame having carrying wheels, of a rack journaled on said frame, means mounted on said frame for tilting said rack on its bearings, means for closing the open end of said rack, and means mounted on said wheeled frame and geared to said closing means for operating the same.

16. The combination, with a wheeled frame, of a tilting rack demountably journaled thereon, teeth for closing the open end of said rack, a support whereon said teeth are mounted, a gear mechanism carried by said support, and a shaft mounted on said wheeled frame and having a driving connection with said gears for operating said teeth independently of said rack.

17. The combination, with a wheeled frame, of a rack frame supported thereon, a rack journaled on said wheeled frame and engaging said rack frame for temporarily holding it in position, means mounted on said rack frame for closing the open forward end of said rack, means mounted on said wheeled frame for tilting said rack, means also mounted on said wheeled frame for operating said rack-closing means, said rack frame and rack being demountable from said wheel frame, and the means for tilting said rack and for operating said closing means becoming automatically disengaged when said rack and rack frame are demounted.

18. The combination with a wheeled frame and a demountable rack-frame carried by the wheeled frame, of a tilting gathering rack mounted in the rack frame, the rack-frame and rack being movable together, and wheels mounted on the rack-frame to adapt the rack and rack-frame to travel upon an overhead track in unloading the rack.

In witness whereof, I have hereunto set my hand this 11th day of July, 1917.

FRED U. FARRAND.

Copies of this patent may be obtained for five cents each, by addressing the "Commissioner of Patents Washington, D. C."